(12) United States Patent
Chandrasekar et al.

(10) Patent No.: US 8,001,127 B2
(45) Date of Patent: Aug. 16, 2011

(54) EFFICIENT EXTRACTION OF XML CONTENT STORED IN A LOB

(75) Inventors: Sivasankaran Chandrasekar, Palo Alto, CA (US); Ashish Thusoo, Fremont, CA (US); Ravi Murthy, Fremont, CA (US); Nipun Agarwal, Santa Clara, CA (US); Eric Sedlar, San Francisco, CA (US); Sreedhar Mukkamalla, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 355 days.

(21) Appl. No.: 12/103,880

(22) Filed: Apr. 16, 2008

(65) Prior Publication Data

US 2008/0195668 A1    Aug. 14, 2008

Related U.S. Application Data

(60) Division of application No. 11/059,612, filed on Feb. 15, 2005, now Pat. No. 7,366,735, and a continuation-in-part of application No. 10/884,311, filed on Jul. 2, 2004, now Pat. No. 7,499,915, and a continuation-in-part of application No. 10/944,170, filed on Sep. 16, 2004, now Pat. No. 7,398,265.

(60) Provisional application No. 60/587,698, filed on Jul. 13, 2004, provisional application No. 60/560,927, filed on Apr. 9, 2004, provisional application No. 60/580,445, filed on Jun. 16, 2004.

(51) Int. Cl.
*G06F 7/00* (2006.01)
*G06F 17/30* (2006.01)

(52) U.S. Cl. ...................................... 707/741

(58) Field of Classification Search .................. 707/741, 707/711, 999.003; 715/239
See application file for complete search history.

(56) References Cited

U.S. PATENT DOCUMENTS

| 5,852,822 | A | 12/1998 | Srinivasan et al. | |
|---|---|---|---|---|
| 2003/0101169 | A1* | 5/2003 | Bhatt et al. | 707/3 |
| 2005/0097084 | A1* | 5/2005 | Balmin et al. | 707/3 |
| 2005/0166140 | A1* | 7/2005 | Cai et al. | 715/513 |

FOREIGN PATENT DOCUMENTS

WO    WO 03/030031    4/2003

OTHER PUBLICATIONS

Grosso, P. et al., "XML Fragment Interchange" Feb. 12, 2001 (18 pages).

(Continued)

*Primary Examiner* — Hosain T Alam
*Assistant Examiner* — Van H Oberly
(74) *Attorney, Agent, or Firm* — Hickman Palermo Truong & Becker LLP; Daniel D. Ledesma

(57) ABSTRACT

A method and system are provided for extracting a valid, self-contained fragment for a node in a XML document stored in a database management system. An XML index is used to identify a location in which XML fragment data corresponding to the node is located. Ancestors of the node are identified and examined for any information needed for the proper interpretation of the fragment. If an ancestor node contains such needed information, this information is patched into the XML fragment to ensure that the fragment is a valid, self-contained XML fragment.

10 Claims, 2 Drawing Sheets

OTHER PUBLICATIONS

Kudrass, T., "Management of XML Documents Without Schema in Relational Database Systems" *Information and Software Technology*, vol. 44, Issue 4, pp. 269-275 (8 pages).

"Office Action" received in related Chinese case 200580019973.9 entitled "Efficient Extraction of XML Content Stored in A LOB" dated Mar. 21, 2008 and an English translation (9 pages).

XML Fragment Interchange [online], W3C, Feb. 12, 2001 [retrieved on Sep. 2, 2010] from the Internet < URL:http://www.w3.org/TR/xml-fragment > (17 pages).

Kawada, et al. "Processing Queries Including User-defined Foreign Functions on XML View over Relational Databases", Dec. 15, 2002, No. SIG 12 (25 pages).

* cited by examiner

EFFICIENT EXTRACTION OF XML CONTENT STORED IN A LOB

PRIORITY CLAIM

This application is a divisional of U.S. patent application Ser. No. 11/059,612 filed Feb. 15, 2005 now U.S. Pat. No. 7,366,735 which is incorporated herein by reference as if fully set forth herein, under 35 U.S.C. §120 which application:

claims priority to U.S. Provisional Patent Application Ser. No. 60/587,698, entitled EFFICIENT EXTRACTION OF XML CONTENT STORED IN A LOB, filed on Jul. 13, 2004, the contents of which are herein incorporated by reference in their entirety for all purposes;

claims priority to U.S. Provisional Patent Application No. 60/560,927 entitled XML INDEX FOR XML DATA STORED IN VARIOUS STORAGE FORMATS, filed on Apr. 9, 2004, the contents of which are herein incorporated by reference in their entirety for all purposes;

claims priority to U.S. Provisional Patent Application No. 60/580,445 entitled XML INDEX FOR XML DATA STORED IN VARIOUS STORAGE FORMATS, filed on Jun. 16, 2004, the contents of which are herein incorporated by reference in their entirety for all purposes;

claims priority to and is a continuation in part of U.S. patent application Ser. No. 10/884,311, entitled INDEX FOR ACCESSING XML DATA, filed on Jul. 2, 2004, now U.S. Pat. No. 7,499,915 the contents of which are herein incorporated by reference in their entirety for all purposes;

claims priority to and is a continuation in part of U.S. patent application Ser. No. 10/944,170, entitled EFFICIENT QUERY PROCESSING OF XML DATA USING XML INDEX, filed on Sep. 16, 2004, now U.S. Pat. No. 7,398,265 the contents of which are herein incorporated by reference in their entirety for all purposes.

FIELD OF THE INVENTION

The present invention relates to managing information and, more specifically, to extracting valid, self-contained XML fragments identified by XPath path expressions from stored XML data.

BACKGROUND

In recent years, database systems that allow storage and querying of eXtensible Markup Language data ("XML data") have been developed. Though there are many evolving standards for querying XML, all of them include some variation of XPath. XPath is a language that describes a way to locate and process items in XML documents by using an addressing syntax based on a path through the document's logical structure or hierarchy. The portion of an XML document identified by an XPath "path expression" is the portion that resides, within the structure of the XML document, at the end of any path that matches the path expression.

XML documents that are managed by a relational database server are typically stored as unstructured serialized data in some form of a LOB (Large Object) datatype. For example, an XML document may be stored in unstructured storage, such as a CLOB (Character LOB) or a BLOB (Binary LOB), or the document may be stored as an O-R (object relational) structure that uses an XML schema).

No matter how the XML document is stored, in order to fulfill many XPath queries, a method of identifying and extracting a fragment of a stored XML document matching an XPath path expression is needed.

Unfortunately, even database systems that have built-in support for storing XML data are usually not optimized for handle path-based queries, and the query performance of the databases systems leaves much to be desired. In specific cases where an XML schema definition may be available, the structure and data types used in XML instance documents may be used to optimize XPath queries. However, in cases where an XML schema definition is not available, and the documents to be searched do not conform to any schema, there are no efficient techniques for path-based querying.

Ad-hoc mechanisms, like a full scan of all documents, or text keyword-based indexes, may be used to increase the performance of querying documents when no XML schema definition is available. However, these mechanisms do not fulfill the need for an efficient method of quickly identifying and extracting a fragment of a stored XML document that matches an XPath path expression.

Even if a method of quickly identifying a location for a fragment of stored XML data were available, a method of efficiently extracting the fragment from the identified location is still needed. The fragment, as it exists at the identified location, may not be a valid, self-contained XML document. For example, namespace prefixes used within a fragment may be declared outside of that fragment, and therefore the fragment retrieved from the identified location will not have all the needed declarations.

Based on the foregoing, there is a clear need for a system and method for identifying and extracting valid, self-contained XML fragments that match an XPath path expression.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figure of the accompanying drawing and in which like reference numerals refer to similar elements and in which.

DETAILED DESCRIPTION

Figure 1:
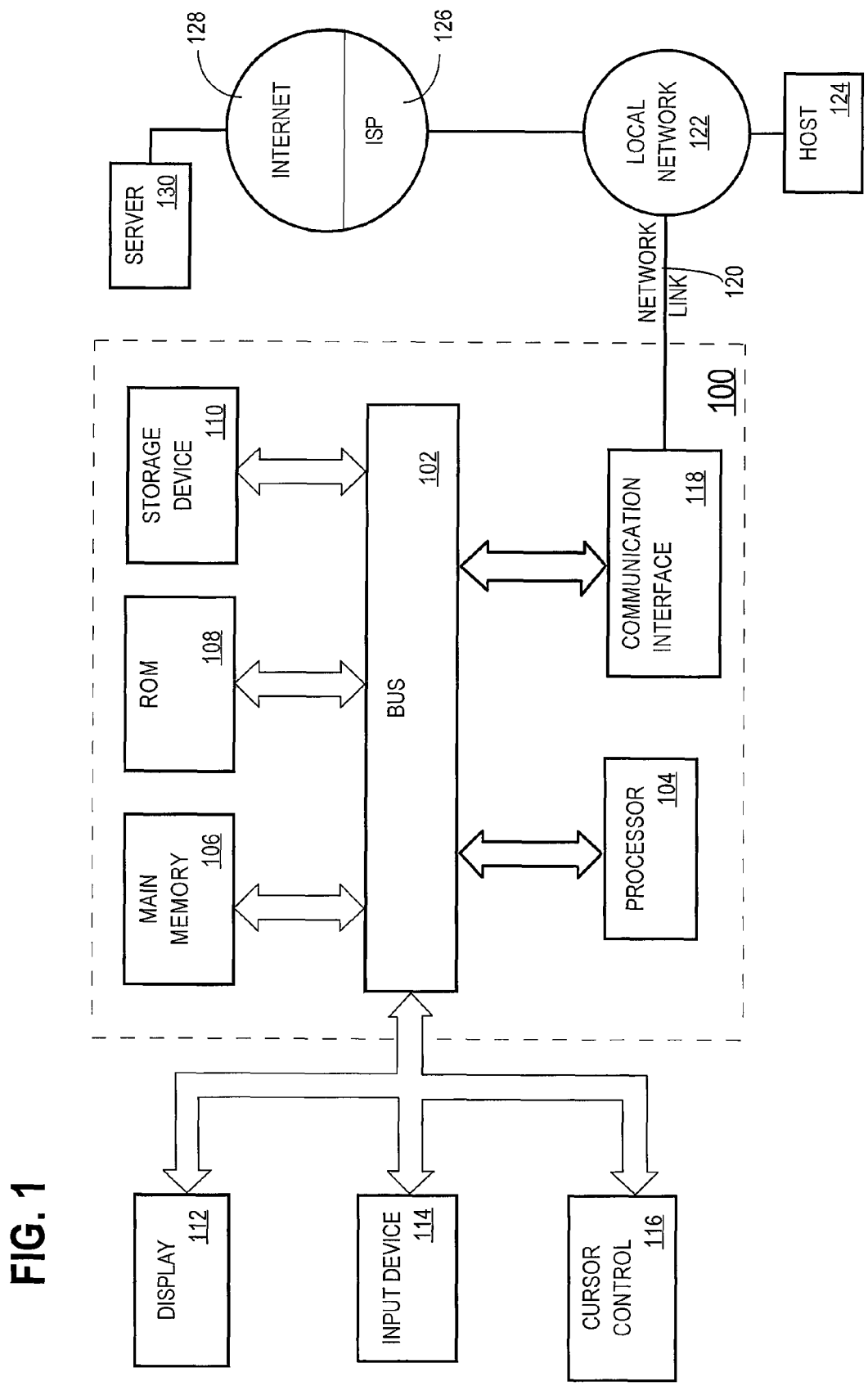
FIG. 1 is a block diagram of a system upon which the techniques described herein may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example XML Documents

For the purpose of explanation, examples shall be given hereafter with reference to the following two XML documents:

```
po1.xml
    <PurchaseOrder>
        <Reference>SBELL-2002100912333601PDT</Reference>
        <Actions>
            <Action>
                <User>SVOLLMAN</User>
            </Action>
        </Actions>
        ....
    </PurchaseOrder>
po2.xml
    <PurchaseOrder>
        <Reference>ABEL-20021127121040897PST</Reference>
        <Actions>
            <Action>
                <User>ZLOTKEY</User>
            </Action>
            <Action>
                <User>KING</User>
            </Action>
        </Actions>
        ....
    </PurchaseOrder>
```

As indicated above, po1.xml and po2.xml are merely two examples of XML documents. The techniques described herein are not limited to XML documents having any particular types, structure or content. Examples shall be given hereafter of how such documents could be indexed and accessed according to various embodiments of the invention.

The XML Index

U.S. patent application Ser. No. 10/884,311, entitled INDEX FOR ACCESSING XML DATA, filed on Jul. 2, 2004, (hereinafter the "XML Index application"), describes various embodiments of an index that may be used to efficiently access XML documents managed by a relational database server, based on XPath queries. Such an index shall be referred to herein as an XML index.

An XML index as described in the XML Index application may be used to process XPath queries regardless of the format and data structures used to store the actual XML data (the "base structures"). For example, the actual XML data can reside in structures within or outside of a database, in any form, such as CLOB (character LOB storing the actual XML text), O-R (object relational structured form in the presence of an XML schema), or BLOB (binary LOB storing some binary form of the XML data).

According to one embodiment, an XML index is a domain index that improves the performance of queries that include XPath-based predicates and/or XPath-based fragment extraction. An XML index can be built, for example, over both XML Schema-based as well as schema-less XMLType columns which are stored either as CLOB or structured storage. In one embodiment, an XML index is a logical index that results from the cooperative use of a path index, a value index, and an order index.

The path index provides the mechanism to lookup nodes based on simple (navigational) path expressions. The value index provides the lookup based on value equality or range. There could be multiple secondary value indexes—one per datatype. The order index associates hierarchical ordering information with indexed nodes. The order index is used to determine parent-child, ancestor-descendant and sibling relationships between XML nodes.

When the user submits a query involving XPaths (as predicate or fragment identifier), the XPath statement is decomposed into a SQL query that accesses the XML index table. The generated query typically performs a set of path, value and order-constrained lookups and merges their results appropriately.

For the purpose of explanation, the techniques described herein are described in a context in which an XML index, as described in the XML Index application, is used to index the XML documents. However, the techniques described herein are not limited to any specific index structure or mechanism, and can be used to identify and extract valid self-contained XML fragments regardless of what method of querying is used.

The Path Table

According to one embodiment, a logical XML index includes a PATH table, and a set of secondary indexes. As mentioned above, each indexed XML document may include many indexed nodes. The PATH table contains one row per indexed node. For each indexed node, the row in the PATH table for the node contains various pieces of information associated with the node.

According to one embodiment, the information contained in the PATH table includes (1) a PATHID that indicates the path to the node, (2) "location data" for locating the fragment data for the node within the base structures, and (3) "hierarchy data" that indicates the position of the node within the structural hierarchy of the XML document that contains the node. Optionally, the PATH table may also contain value information for those nodes that are associated with values. Each of these types of information shall be described in greater detail below.

Paths

The structure of an XML document establishes parent-child relationships between the nodes within the XML document. The "path" for a node in an XML document reflects the series of parent-child links, starting from a "root" node, to arrive at the particular node. For example, the path to the "User" node in po2.xml is /PurchaseOrder/Actions/Action/User, since the "User" node is a child of the "Action" node, the "Action" node is a child of the "Actions" node, and the "Actions" node is a child of the "PurchaseOrder" node.

The set of XML documents that an XML index indexes is referred to herein as the "indexed XML documents". According to one embodiment, an XML index may be built on all of the paths within all of the indexed XML documents, or a subset of the paths within the indexed XML documents. Techniques for specifying which paths are indexed are described hereafter. The set of paths that are indexed by a particular XML index are referred to herein as the "indexed XML paths".

PATHIDS

According to one embodiment, each of the indexed XML paths is assigned a unique path identifier ("PATHID"). For example, the paths that exist in po1.xml and po2.xml may be assigned PATHIDs as illustrated in the following table:

| PATHID | PATH |
| --- | --- |
| 1 | /PurchaseOrder |
| 2 | /PurchaseOrder/Reference |
| 3 | /PurchaseOrder/Actions |

-continued

| PATHID | PATH |
|---|---|
| 4 | /PurchaseOrder/Actions/Action |
| 5 | /PurchaseOrder/Actions/Action/User |

Various techniques may be used to identify paths and assign PATHIDs to paths. For example, a user may explicitly enumerate paths, and specify corresponding PATHIDs for the paths thus identified. Alternatively, the database server may parse each XML document as the document is added to the set of indexed XML documents. During the parsing operation, the database server identifies any paths that have not already been assigned a PATHID, and automatically assigns new PATHIDs to those paths. The PATHID-to-path mapping may be stored within the database in a variety of ways. According to one embodiment, the PATHID-to-path mapping is stored as metadata separate from the XML indexes themselves.

According to one embodiment, the same access structures are used for XML documents that conform to different schemas. Because the indexed XML documents may conform to different schemas, each XML document will typically only contain a subset of the paths to which PATHIDs have been assigned.

Location Data

The location data associated with a node indicates (1) where the XML document that contains the node resides within the base structures, and (2) where the XML fragment that corresponds to the node is located within the stored XML document. Thus, the nature of the location data will vary from implementation to implementation based on the nature of the base structures. Location information is typically added to the PATH table as XML documents are parsed.

For the purpose of explanation, it shall be assumed that (1) the base structures are tables within a relational database, and (2) each indexed XML document is stored in a corresponding row of a base table. In such a context, the location data for a node may include, for example, (1) the identifier of the row ("RID") in the base table in which the XML document containing the node is stored, and (2) a locator that provides fast access within the stored XML document, to the fragment data that corresponds to the node.

A locator is conceptually a piece of information that "points" into the original document, and is typically used to retrieve fragment data starting from that point. The locator is dependent on the actual storage used for the XML documents, and can be different for CLOB, O-R or BLOB forms of storage. For example, the locator for a node in an XML document that is stored in a CLOB could be the starting character offset within the CLOB at which the node starts. In addition, a byte length for the node may be stored as part of the locator. Together, this information provides starting and ending locations within a stored XML document, and can be used to efficiently extract an XML fragment. For example, a locator may be used to retrieve a XML fragment containing a node that matches a specified XPath query by extracting data, beginning at the character offset specified by the locator, and reading the data for the number of bytes indicated by the locator.

Locators can be more complex than character or byte offsets, however. For example, a locator could include certain flags. As another example, if the XML document is stored shredded into relational table(s), the locator could contain appropriate table and/or row identifier(s), etc.

Hierarchy Data

The PATH table row for a node also includes information that indicates where the node resides within the hierarchical structure of the XML document containing the node. Such hierarchical information is referred to herein as the "OrderKey" of the node.

According to one embodiment, the hierarchical order information is represented using a Dewey-type value. Specifically, in one embodiment, the OrderKey of a node is created by appending a value to the OrderKey of the node's immediate parent, where the appended value indicates the position, among the children of the parent node, of that particular child node.

For example, assume that a particular node D is the child of a node C, which itself is a child of a node B that is a child of a node A. Assume further that node D has the OrderKey 1.2.4.3. The final "3" in the OrderKey indicates that the node D is the third child of its parent node C. Similarly, the 4 indicates that node C is the fourth child of node B. The 2 indicates that Node B is the second child of node A. The leading 1 indicates that node A is the root node (i.e. has no parent).

As mentioned above, the OrderKey of a child may be easily created by appending to the OrderKey of the parent a value that corresponds to the number of the child. Similarly, the OrderKey of the parent is easily derived from the OrderKey of the child by removing the last number in the OrderKey of the child.

According to one embodiment, the composite numbers represented by each OrderKey are converted into byte-comparable values, so that a mathematical comparison between two OrderKeys indicates the relative position, within the structural hierarchy of an XML document, of the nodes to which the OrderKeys correspond.

For example, the node associated with the OrderKey 1.2.7.7 precedes the node associated with the OrderKey 1.3.1 in the hierarchical structure of an XML document. Thus, the database server uses a conversion mechanism that converts OrderKey 1.2.7.7 to a first value, and to convert OrderKey 1.3.1 to a second value, where the first value is less than the second value. By comparing the second value to the first value, the database server can easily determine that the node associated with the first value precedes the node associated with the second value. Various conversion techniques may be used to achieve this result, and the invention is not limited to any particular conversion technique.

Value Information

Some nodes within an indexed document may be attribute nodes or nodes that correspond to simple elements. As used herein, a "simple element" is an element that does not have any attributes or children elements, and whose value is a single text string. For example, in "po1.xml", the "Reference" element is a simple element with a single text value of "SBELL-2002100912333601PDT".

According to one embodiment, for attribute nodes and simple elements, the PATH table row also stores the actual value of the attributes and simple elements. Such values may be stored, for example, in a "value column" of the PATH table. The secondary "value indexes", which shall be described in greater detail hereafter, are built on the value column.

Path Table Example

According to one embodiment, the PATH table includes columns defined as specified in the following table:

| Column Name | Datatype | Description |
|---|---|---|
| PATHID | RAW(8) | ID for the path token. Each distinct path e.g. /a/b/c is assigned a unique id by the system. |
| RID | UROWID/ ROWID | Identifier of the row in base table that stores the XML document containing the node. |
| ORDER_KEY | RAW(100) | Dewey OrderKey for the node e.g. 3.21.5 to indicate $5^{th}$ child of $21^{st}$ child of $3^{rd}$ child of root. |
| LOCATOR | RAW(100) | Information corresponding to the starting position for the fragment. This is used during fragment extraction. |
| VALUE | RAW(2000)/ BLOB | Value of the node in case of attributes and simple elements. The type can be specified by the user (as well as the size of the RAW column) |

As explained above, the PATHID is an identifier assigned to the node, and uniquely represents a fully expanded path to the node. The ORDER_KEY is a system representation of the Dewey ordering number associated with the node. According to one embodiment, the internal representation of the Order-Key also preserves document ordering.

The VALUE column stores the effective text value for simple element (i.e. no element children) nodes and attribute nodes. According to one embodiment, adjacent text nodes are coalesced by concatenation. As described in the XML Index application, a mechanism is provided to allow a user to customize the effective text value that gets stored in VALUE column by specifying options during index creation e.g. behavior of mixed text, whitespace, case-sensitive, etc can be customized. The user can store the VALUE column in any number of formats, including a bounded RAW column or a BLOB. If the user chooses bounded storage, then any overflow during index creation is flagged as an error.

The following table is an example of a PATH table that (1) has the columns described above, and (2) is populated with entries for po1.xml and po2.xml. Specifically, each row of the PATH table corresponds to an indexed node of either po1.xml or po2.xml. In this example, it is assumed that po1.xml and po2.xml are respectively stored at rows R1 and R2 of a base table.

In this example, the rowid column stores a unique identifier for each row of the PATH table. Depending on the database system in which the PATH table is created, the rowid column may be an implicit column. For example, the disk location of a row may be used as the unique identifier for the row. As shall be described in greater detail hereafter, the secondary Order and Value indexes use the rowid values of the PATH table to locate rows within the PATH table.

In the embodiment illustrated above, the PATHID, ORDER_KEY and VALUE of a node are all contained in a single table. In alternative embodiment, separate tables may be used to map the PATHID, ORDER_KEY and VALUE information to corresponding location data (e.g. the base table RID and LOCATOR).

In the embodiment illustrated above, the information in the "RID" and the "LOCATOR" columns of the PATH table is used to identify a location where the indexed node is stored. In this example, each row in a base table corresponds to an indexed XML document. Each row in the base table rows uses a CLOB to store the associated XML document. The RID column in the PATH table identifies the row in the base table where the XML document is stored as a CLOB, and the LOCATOR column stores a character offset into the CLOB where the indexed node starts and a character length for the node.

For example, the above-mentioned sample XML documents po1.xml and po1.xml are stored in unstructured serialized form in rows R1 and R2 of the base table as CLOB data structures. The node identified by rowid "1" in the PATH table is located starting at character 1 of the CLOB stored in base table row R1, and has a length of 350 characters. As another example, the node identified by rowid "9" is located in row R2 of the base table, and starts at character 72 with a length of 36 characters. This row of the PATH table corresponds to the first <Action> node of po2.xml, shown below:

```
<Action>
    <User>ZLOTKEY</User>
</Action>
```

The example shown in the populated PATH table above illustrates an embodiment in which locator information is not stored for simple elements and attribute nodes. In other embodiments, locator information could be stored and maintained for all nodes, including simple elements. In addition, the example shown in the populated PATH table illustrates an embodiment in which the LOCATOR column stores both

POPULATED PATH TABLE

| rowid | PATHID | RID | ORDER_KEY | LOCATOR | VALUE |
|---|---|---|---|---|---|
| 1 | 1 | R1 | 1 | 1, 350 | |
| 2 | 2 | R1 | 1.1 | | SBELL-2002100912333601PDT |
| 3 | 3 | R1 | 1.2 | 64, 56 | |
| 4 | 4 | R1 | 1.2.1 | 73, 37 | |
| 5 | 5 | R1 | 1.2.1.1 | | SVOLLMAN |
| 6 | 1 | R2 | 1 | 1, 400 | |
| 7 | 2 | R2 | 1.1 | | ABEL-20021127121040897PST |
| 8 | 3 | R2 | 1.2 | 63, 89 | |
| 9 | 4 | R2 | 1.2.1 | 72, 36 | |
| 10 | 5 | R2 | 1.2.1.1 | | ZLOTKEY |
| 11 | 4 | R2 | 1.2.2 | 109, 33 | |
| 12 | 5 | R2 | 1.2.2.1 | | KING | offset and length information. In alternative embodiments, only offset information may be stored. Alternatively, as discussed above, other types of locator information may be stored in the LOCATOR column. The techniques described herein are not dependent on any particular type of location data.

Secondary Indexes

The PATH table includes the information required to locate the XML documents, and/or XML fragments, that satisfy a wide range of queries. However, without secondary access structures, using the PATH table to satisfy such queries will often require full scans of the PATH table. Therefore, according to one embodiment, a variety of secondary indexes are created by the database server to accelerate the queries that (1) perform path lookups and/or (2) identify order-based relationships. According to one embodiment, the following secondary indexes are created on the PATH table.

PATHID_INDEX on (PATHID, RID)
ORDERKEY_INDEX on (RID, ORDER_KEY)
VALUE INDEXES
PARENT_ORDERKEY_INDEX on (RID, SYS_DEWEY_PARENT(ORDER_KEY))

PATHID_INDEX

The PATHID_INDEX is built on the PATHID, RID columns of the PATH table. Thus, entries in the PATHID_INDEX are in the form (keyvalue, rowid), where keyvalue is a composite value representing a particular PATHID/RID combination, and rowid identifies a particular row of the PATH table.

When (1) the base table row and (2) the PATHID of a node are known, the PATHID_INDEX may be used to quickly locate the row, within the PATH table, for the node. For example, based on the key value "3.R1", the PATHID_INDEX may be traversed to find the entry that is associated with the key value "3.R1". Assuming that the PATH table is populated as illustrated above, the index entry would have a rowid value of 3. The rowid value of 3 points to the third row of the PATH table, which is the row for the node associated with the PATHID 3 and the RID R1.

The ORDERKEY_INDEX

The ORDERKEY_INDEX is built on the RID and ORDER_KEY columns of the PATH table. Thus, entries in the ORDERKEY_INDEX are in the form (keyvalue, rowid), where keyvalue is a composite value representing a particular RID/ORDER_KEY combination, and rowid identifies a particular row of the PATH table.

When (1) the base table row and (2) the ORDERKEY of a node are known, the ORDERKEY_INDEX may be used to quickly locate the row, within the PATH table, for the node. For example, based on the key value "R1.'1.2'", the ORDERKEY_INDEX may be traversed to find the entry that is associated with the key value "R1.'1.2'". Assuming that the PATH table is populated as illustrated above, the index entry would have a rowid value of 3. The rowid value of 3 points to the third row of the PATH table, which is the row for the node associated with the ORDERKEY 1.2 and the RID R1.

The Value Indexes

Just as queries based on path lookups can be accelerated using the PATHID_INDEX, queries based on value lookups can be accelerated by indexes built on the VALUE column of the PATH table. However, the VALUE column of the PATH table can hold values for a variety of data types. Therefore, according to one embodiment, a separate value index is built for each data type stored in the VALUE column. Thus, in an implementation in which the VALUE column holds strings, numbers and timestamps, the following value (secondary) indexes are also created:

STRING_INDEX on SYS_XMLVALUE_TO_STRING (value)
NUMBER_INDEX on SYS_XMLVALUE_TO_NUMBER(value)
TIMESTAMP_INDEX on SYS_XMLVALUE_TO_TIMESTAMP(value)

These value indexes are used to perform datatype based comparisons (equality and range). For example, the NUMBER value index is used to handle number-based comparisons within user XPaths. Entries in the NUMBER_INDEX may, for example, be in the form (number, rowid), where the rowid points to a row, within the PATH table, for a node associated with the value of "number". Similarly, entries within the STRING_INDEX may have the form (string, rowid), and entries within the TIMESTAMP_INDEX may have the form (timestamp, rowid).

The format of the values in the PATH table may not correspond to the native format of the data type. Therefore, when using the value indexes, the database server may cell conversion functions to convert the value bytes from stored format to the specified datatype. In addition, the database server applies any necessary transformations, as shall be described hereafter. According to one embodiment, the conversion functions operate on both RAW and BLOB values and return NULL if the conversion is not possible.

By default, the value indexes are created when the XML index is created. However, users can suppress the creation of one or more of value indexes based on the knowledge of query workload. For example, if all XPath predicates involve string comparisons only, the NUMBER and TIMESTAMP value indexes can be avoided.

PARENT_ORDERKEY_INDEX

According to one embodiment, the set of secondary indexes built on the PATH table include a PARENT_ORDERKEY_INDEX. Similar to the ORDER_KEY index, the PARENT_ORDERKEY_INDEX is built on the RID and ORDER_KEY columns of the PATH table. Consequently, the index entries of the PARENT_ORDERKEY_INDEX have the form (keyvalue, rowid), where keyvalue is a composite value that corresponds to a particular RID/ORDER_KEY combination. However, unlike the ORDER_KEY index, the rowid in a PARENT_ORDERKEY_INDEX entry does not point to the PATH table row that has the particular RID/ORDER_KEY combination. Rather, the rowid of each PARENT_ORDERKEY_INDEX entry points to the PATH table row of the node that is the immediate parent of the node associated with the RID/ORDER_KEY combination.

For example, in the populated PATH table illustrated above, the RID/ORDER_KEY combination "R1.'1.2'" corresponds to the node in row 3 of the PATH table. The immediate parent of the node in row 3 of the PATH table is the node represented by row 1 of the PATH table. Consequently, the PARENT_ORDERKEY_INDEX entry associated with the "R1.'1.2'" key value would have a rowid that points to row 1 of the PATH table (i.e. rowid=1).

Using the XML Index to Process XPath Queries

As described above, an XML index improves the performance of XPath-based queries and fragment extraction by capturing the essential parts of an XML document-tags, values and nesting information—in PATH, VALUE and ORDER indexes. The PATH index is used to index the tags and provides a mechanism to identify fragments based on simple path expressions. The VALUE index allows the XML values to be indexed. The ORDER index associates hierarchical ordering information with indexed nodes, and is used to determine parent-child, ancestor-descendant and sibling relationships between XML nodes.

When a user submits a query involving XPaths, the XPath expressions can be decomposed into SQL queries accessing the XML index table. The generated queries typically perform a set of path, value and order-constrained lookups and merge the results appropriately.

In particular, co-pending application U.S. patent application Ser. No. 10/944,170, entitled "EFFICIENT QUERY PROCESSING OF XML DATA USING XML INDEX", filed Sep. 16, 2004, (hereinafter the "Query Processing" application), describes various embodiments of a method for performing an "index-enabled" query that uses the XML index to identify the XML data corresponding to a specified path. In particular, the Query Processing application describes techniques for using the XML Index to evaluate the XPath operators.

More specifically, the Query Processing application describes techniques for (1) decomposing a generic path expression into simpler components such as simple paths, predicates and structural joins; (2) generating a SQL query against tables of the XML index, which may involve expressing the structural joins using SQL predicates on Dewey order keys of the indexed paths components; and (3) fragment extraction using locators that point to the original data.

Index-enabled queries are generated based on path expressions, and access the PATH table of the XML index. The path expression of a path-based query, or fragments thereof, are matched against templates. Each template is associated with a rule. When a fragment of a specified path is in a format that matches a template, the corresponding rule is then used to generate SQL for an index-enabled query. This process is described in detail in the Query Processing application.

Using the XML Index to Process Extract( ) Operator

One XPath operator that may be evaluated using the techniques described in the Query Processing application is the extract( ) operator. The result of an XPath extract( ) operator is an XMLType containing the XML fragment(s) of the XML document(s) that satisfy the specified XPath expression.

As described in the Query Processing application, the extract( ) operator can be rewritten as an SQL query on the XML Index tables. For example, the extract( ) operator for an XPath query on the /PurchaseOrder/Actions nodes may be translated into an SQL query as follows:

```
select extract(value(p), '/PurchaseOrder/Actions')
from po_tab p;
    →
select xmlagg(select SYS_XMLINDEX_MKXML(rid, order_key,
locator, value)
    from path_table
        where pathid = :B1 and rid = p.rowid)
from po_tab p
``` where :B1=pathid('/PurchaseOrder/Actions') (pathid( ) is an internal function used to look up the PATHID associated with the concerned path) and po_tab is the base table that contains the stored XML documents.

The SYS_XMLINDEX_MKXML( ) operator builds an XMLType image based on the index column values. In one embodiment, this lookup may be implemented using the SYS_XMLINDEX_GETFRAG( ) operator. Given a row identifier and a locator, the SYS_XMLINDEX_GETFRAG( ) operator constructs an XMLType image consisting of an XML fragment corresponding to the row identifier and locator.

XMLAGG( ) is an operator that concatenates the fragments generated by the SYS_XMLINDEX_MKXML( ) operator. Using the example above, for each row that contains the node '/PurchaseOrder/Actions', a fragment is retrieved from the base table and aggregated into a single XMLType image.

For example, using the populated PATH table above, the output of:

```
select extract(value(T), '/PurchaseOrder/Reference')
from xmltab T
would result in:
    <Reference>SBELL-2002100912333601PDT</Reference>
    <Reference>ABEL-20021127121040897PST</Reference>
```

In one embodiment, the output returned is a single long string created by concatenating the above results, including start and end tags.

The techniques described herein are used to implement the SYS_XMLINDEX_GETFRAG( ) operator that obtains the actual text fragment corresponding to a node.

Efficient Extraction Process

Figure 2:
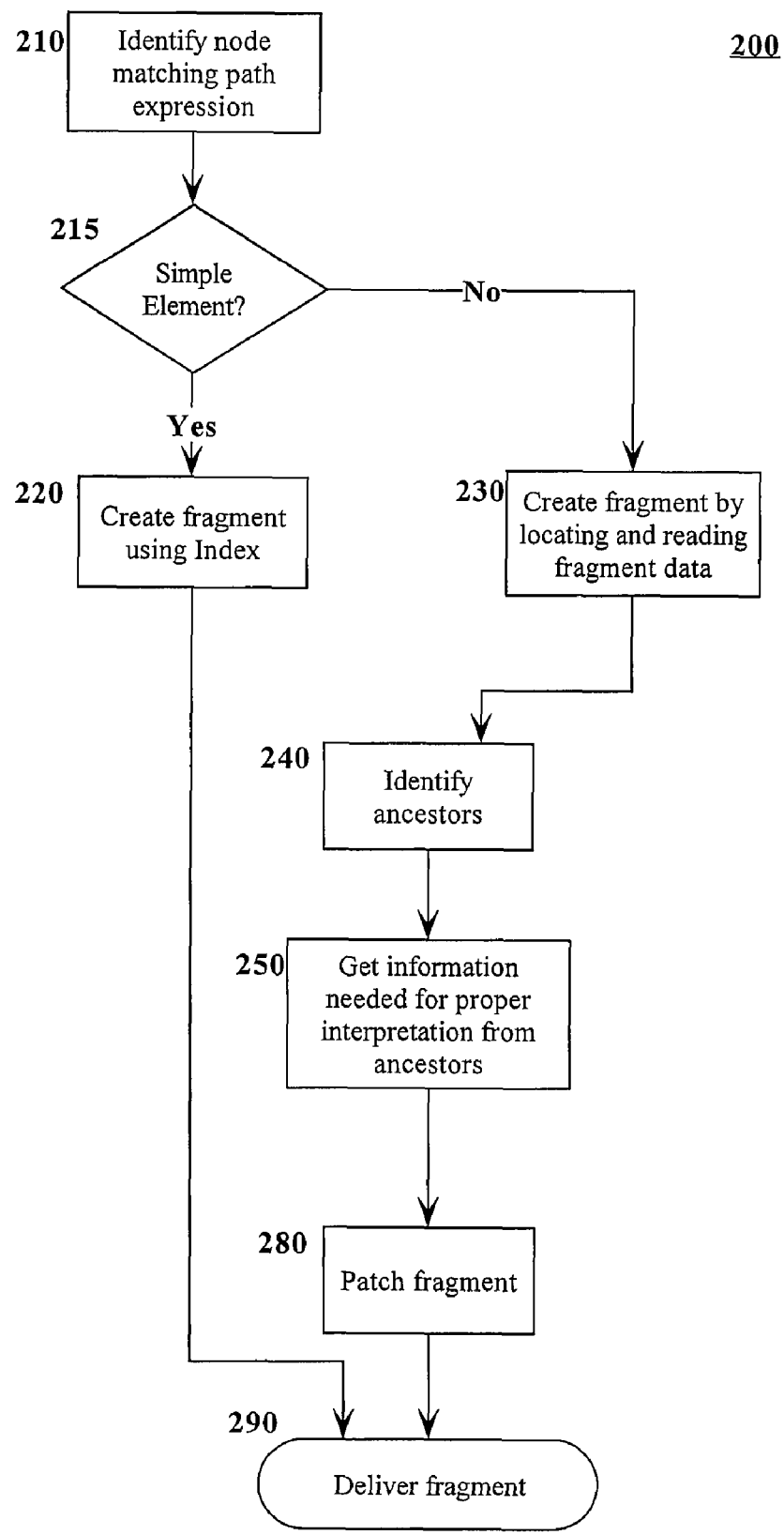
FIG. 2 is a flowchart illustrating steps for efficiently providing a self-contained XML fragment in response to a request.

Process 200 shown in FIG. 2 illustrates the steps of one technique for extracting an XML fragment, according to an embodiment of the invention. As shown, a node is first identified at step 210. Any technique, such as those describe in the XML Index and Query Processing applications, can be used to identify a node that matches a path expression.

Next, the node is examined at step 215 to determine if it is a simple element or a complex element. As mentioned above, simple elements are elements having no children or attributes, and whose value is a single text value. A complex element is an element that either has attributes or has element children.

If the node is a simple element, then the fragment can be constructed without consulting the original XML document, using information stored in the XML index, as shown by step 220. If the node is a complex element, the original XML document stored in a base table is consulted to extract the fragment, as shown by step 230, and the extracted fragment is patched as needed for proper interpretation. Each process is described in more detail below.

Although the embodiment of the process shown in FIG. 2 takes advantage of the information stored in the XML index to construct the fragment without consulting the original XML document, it is not a requirement that simple and complex elements be treated differently. Fragments matching any type of element, simple or complex, can be extracted from the stored XML data.

Simple Element Fragments

When stored XML documents are indexed with an XML index, the values of simple elements are present in the VALUE column of the PATH table. Therefore, the XML fragment for simple elements can be constructed without consulting the base table that stores the original XML document. The fragment is built by adding appropriate start and end tags to the value obtained from the VALUE column of the PATH table for the identified node.

For example, the node '/PurchaseOrder/Reference' is a simple element in the XML documents po1.xml and po2.xml above. The PATHID for the expression '/PurchaseOrder/Reference' is first determined. In this example, the PATHID is "2". The PATH table is examined to determine if any nodes correspond to this PATHID (step 210). In this example, nodes with rowids of "2" and "7" are a match for PATHID=2. The process of FIG. 2 is executed for each matching node.

At step 215, for both node 2 and node 7, it can be determined that each is a simple element by examining the LOCATOR and VALUE columns for these rows, as there is no Locator information, and the VALUE column contains a simple text string. For each of these simple element nodes, the process continues to step 220. In step 220, a fragment for the node can be built by creating a string that contains a start tag, a value and an end tag. The start tag is created by extracting the last component of the path associated with this PATHID (in this example "Reference"). The VALUE corresponding to this node in the PATH table is put in the fragment after the start tag. For example, the VALUE component of the fragment for node 2 is "SBELL-2002100912333601PDT". A close tag consisting of the close character '/' and the component string determined above (e.g. "Reference") completes the fragment string. By following this process, the fragment for node 2 is determined to be "<Reference>SBELL-2002100912333601PDT</Reference>". This matches the fragment of the original XML document po1.xml corresponding to this node.

Queries that extract only attributes may be treated like simple elements. However, elements containing attributes are treated as complex elements, discussed in more detail below.

Because the system can add the namespace and a generated prefix, simple elements do not need patching for proper interpretation, and the process continues to step 290 for simple elements.

Extracting Complex Elements Using the XML Index

For complex element nodes, the fragment must be parsed from base table that stores the XML document associated with the complex element. As discussed above, each row in PATH table corresponds to a node in an XML document, and includes a RID of the row in the base table that contains the original XML document and a locator for finding the node within the XML document stored in the base table.

For example, an XPath extract( ) on the node /PurchaseOrder/Reference/Actions should result in the aggregated fragment:

```
<Actions>
    <Action>
        <User>SVOLLMAN</User>
    </Action>
</Actions>
<Actions>
    <Action>
        <User>ZLOTKEY</User>
    </Action>
    <Action>
        <User>KING</User>
    </Action>
</Actions>
```

Unlike the simple elements described above, however, these fragments are extracted from the stored XML documents. For example, the path expression "/PurchaseOrder/Reference/Actions" corresponds to PATHID 3. From the PATH table, nodes with rowids 3 and 8 match this PATHID. The VALUE column for these rows is empty, and the LOCATOR column provides offset and length information for extracting the fragments. Therefore at step 215, it is determined that each of these nodes corresponds to a complex element, and the process continues to step 230.

At step 230, fragment text corresponding to the node is located and read. For example, for node 3, the RID column indicates that the stored XML data is located at row R1 of the base table, and the LOCATOR field indicates that the fragment starts at character 64 and has a length of 56. The fragment text corresponding to node 3 can thus be created by extracting characters 64-120 from the CLOB in row R1 of the base table that contains "po1.xml". The XML fragment corresponding to node 8 can likewise be created by extracting characters 63-152 from the CLOB in row R2 of the base table that contains "po2.xml".

In these examples, the extracted XML fragments happen to be valid. However, in many cases, the XML fragment extracted using these methods may not be self-contained. For example, the extracted fragment may contain or use references that are not defined within the fragment. The methods described herein allow for "patching" the fragments created using the above techniques to ensure that the resulting fragments are valid and self-contained.

Prefixes and Namespaces

Since element names in XML are not fixed, a name conflict can occur when two different documents use the same names describing two different types of elements. One standard method of avoiding name conflicts is to use a prefix with the name.

For example, Tables 1 and 2 illustrate XML documents that both use a "table" element.

TABLE 1

| 1 | <table> |
|---|---|
| 2 | <tr> |
| 3 | <td>Apples</td> |
| 4 | <td>Bananas</td> |
| 5 | </tr> |
| 6 | </table> |

TABLE 2

| 1 | <table> |
|---|---|
| 2 | <name>Coffee Table</name> |
| 3 | <width>80</width> |
| 4 | <length>120</length> |
| 5 | </table> |

If these two XML documents were both stored in database, there could potentially be an element name conflict because both documents contain a <table> element with different content and definition. One standard way of resolving and preventing these types of conflicts is through the use of namespace prefixes. As an example, Tables 1A and 2A below illustrate how the XML documents of Tables 1 and 2 could be modified to avoid element name conflicts.

TABLE 1A

| 1 | <h:table> |
|---|---|
| 2 | <h:tr> |
| 3 | <h:td>Apples</h:td> |
| 4 | <h:td>Bananas</h:td> |
| 5 | </h:tr> |
| 6 | </h:table> |

TABLE 2A

| 1 | <f:table> |
|---|---|
| 2 | <f:name>Coffee Table</f:name> |
| 3 | <f:width>80</f:width> |
| 4 | <f:length>120</f:length> |
| 5 | </f:table> |

As shown in Tables 1A and 2A, the element name conflict is no longer a problem because the two documents use a different name for their <table> element (namely, <h:table> and <f:table>). By using a prefix, two different types of <table> elements are possible.

The prefixes typically refer to XML documents that carry information about the elements. Tables 1B and 2B show how the prefixes can be defined to refer to specific namespaces.

TABLE 1B

| 1 | <h:table xmlns:h="http://www.w3.org/TR/html4/"> |
|---|---|
| 2 | <h:tr> |
| 3 | <h:td>Apples</h:td> |
| 4 | <h:td>Bananas</h:td> |
| 5 | </h:tr> |
| 6 | </h:table> |

TABLE 2B

| 1 | <f:table xmlns:f="http://www.w3schools.com/furniture"> |
|---|---|
| 2 | <f:name>Coffee Table</f:name> |
| 3 | <f:width>80</f:width> |
| 4 | <f:length>120</f:length> |
| 5 | </f:table> |

Instead of using only prefixes, an xmlns attribute has been added to the <table> tag to give the element prefix a qualified name associated with a namespace. Typically, the namespace attribute is placed in the start tag of an element with the following syntax:

xmlns:namespace-prefix="namespace"

As shown by Tables 1B and 2B, the namespace itself can be defined using an Internet address, although any Uniform Resource Identifier (URI) can be used. Multiple namespace prefixes can be declared as attributes of a single element.

When a namespace is defined as an attribute in the start tag of an element, all child elements with the same prefix are associated with the same namespace. In addition, a default namespace can be used for an element, as shown in Tables 1C and 2C. When a default namespace is used, prefixes do not have to be used in all the child elements. A default namespace declaration applies to all unprefixed element names within its scope.

TABLE 1C

| 1 | <table xmlns="http://www.w3.org/TR/html4/"> |
|---|---|
| 2 | <tr> |
| 3 | <td>Apples</td> |
| 4 | <td>Bananas</td> |
| 5 | </tr> |
| 6 | </table> |

TABLE 2C

| 1 | <table xmlns="http://www.w3schools.com/furniture"> |
|---|---|
| 2 | <name>Coffee Table</name> |
| 3 | <width>80</width> |
| 4 | <length>120</length> |
| 5 | </table> |

The prefix provides the namespace prefix part of the qualified name, and must be associated with a namespace reference in a namespace declaration. The prefix functions only as a placeholder for a namespace name. A namespace name, not the prefix, is used in constructing names whose scope extends beyond the containing document. Prefixes and namespace declarations can apply to attributes as well as elements.

The scope of a namespace declaration declaring a prefix extends from the beginning of the start tag in which it appears to the end of the corresponding end tag, excluding the scope of any inner declarations that use the same prefix name. Such a namespace declaration applies to all element and attribute names within its scope whose prefix matches that specified in the declaration.

The namespace prefix must have been declared in a namespace declaration attribute in either the start tag of the element where the prefix is used or in an ancestor element. This constraint may lead to difficulties in the case where the namespace declaration attribute is provided, not directly in the XML document, but via a default attribute declared in an external entity.

This is particularly problematic in the context of fragment extraction. Not only are declarations in external documents a problem, but an extracted XML fragment may use a prefix that was declared in an earlier section of the document from which the fragment is extracted. In addition, a fragment may be extracted that is on its face valid as the extracted fragment has no direct reference to any namespace; however, the extracted fragment should use the default namespace declaration of an ancestor if it is within the scope of the ancestor element.

The techniques described herein solve this problem by building a list of namespace declarations from the desired node and from all its ancestors. This list is built by querying the PATH table. The list is then spliced into the fragment created at step 230 to obtain a complete, valid, self-contained XML fragment.

Handling of Namespace Declarations in Fragment Extraction

As discussed above, when an XPath extract( ) operator is evaluated with respect to a simple element, the desired fragment can constructed using only the PATH table. When a complex element is extracted, the fragment is read from the original data using location information from the PATH table. However, when a prefix is used in an extracted XML fragment, the extracted fragment must also account for the prefix. In addition, any default namespace declarations that are used in ancestor elements of the node to be extracted must be considered.

For example, consider the example XML document "po3.xml" in Table 3:

TABLE 3

| 1 | <po:purchaseOrder xmlns:po="po.xsd" xmlns:po2="po2.xsd" actionDate="04-04-04"> |
| --- | --- |
| | ... |
| 100 | <po:LineItem> |
| 101 | <myns:SomeOtherTag xmlns:myns="MyNs" xmlns:ns2="MyNs2"> |
| 102 | <myns:MoreTags>foo</myns:MoreTags> |
| 103 | <po:quantity>1200</po:quantity> |
| 104 | </myns:SomeOtherTag> |
| 105 | <po:USPrice>148.95</po:USPrice> |
| 106 | </po:LineItem> |
| 107 | <po:LineItem> |
| | ... |
| 150 | </po:LineItem> |
| | ... |
| 180 | </po:PurchaseOrder> |

If the XPath query "extract(/po:purchaseOrder/po:lineItem/myns:SomeOtherTag)" is evaluated using only the process described above, the resulting fragment returned by the query would consist of lines 101-104 of Table 3. However, this XML fragment references the namespace prefix "po", which is not defined anywhere in the fragment that is extracted according to the locator information (i.e. lines 101-104). Instead, this prefix is declared and mapped to the namespace "po.xsd" in line 1 of Table 1.

The declaration 'xmlns:po="po.xsd"' needs to be spliced into the fragment created in step 230 in order for the fragment to be interpreted properly, i.e. be "self-contained."

In one embodiment the namespace declarations can be maintained in the locator itself. However, this information would then be present at every level. In a preferred embodiment, the declaration information is built using information stored in the PATH table. In this embodiment, an SQL query is used to identify all ancestor nodes of the node being extracted, and namespace declarations are collected from the ancestor nodes. In addition, the techniques described herein resolve namespace declarations correctly, that is, in reverse order with deeper declarations over-riding shallow declarations, in order to adhere to XML namespace scoping rules, discussed previously.

As shown by step 240 in FIG. 2, ancestors of the node are identified. If an XML index is used, this is a simple query as ancestor information is stored using OrderKeys. At step 250, information needed for the proper interpretation of the XML fragment is retrieved for each identified ancestor. If there are any declarations or other information retrieved from the ancestors needed for proper interpretation of the fragment, this information is patched into the fragment at step 280. For example, namespace declarations for any prefix used but not defined in the fragment are retrieved from the closest ancestor node and patched into the fragment created at step 230.

For example, the following SQL query could be used to go over all ancestor nodes to collect the namespace declarations and resolve them correctly. (:B1=RID of the document being considered; :B2=OrderKey of the node to be extracted):

```
select p1.pathid, p1.order_key, p1.value
from path-table p1
where is_ns_attr(p1.pathid)=1
and p1.rid = :B1
and exists(select 1
    from path-table p2
    where p2.rid = :B1
    and p2.order_key = DEWEY_PARENT(p1.order_key)
    and p2.order_key <= :B2 and maxchild(p2.order_key) > :B2)
order by order_key desc;
```

As shown, the outer subquery selects all namespace declarations in the given document. For each such declaration, the exists( ) subquery determines if the declaration is present in an ancestor element.

In order to correctly account for scoping rules, declarations present in ancestor elements that are also present in descendants should be ignored as descendants over-ride the parent declarations. In addition, declarations present in a parent element over-rides declarations in grandparent elements, and so forth. By considering each ancestor in proper order and accounting for scoping rules, a list of declarations that need to be added to the fragment is created in step 250. To account for scoping rules, the ancestor nodes are considered from closest to most distant. As each declaration is found in an ancestor, if it has already been considered, either as part of the fragment itself or in an earlier ancestor node, it is ignored. Otherwise, it is added to a string to be patched into the fragment.

For example, consider the following XPath query for a node in Table 3:

extract('/po:purchaseOrder/po:lineItem/myns:
SomeOtherTag')

The fragment extracted from Table 3 in step 230 is:

```
<myns:SomeOtherTag xmlns:myns="MyNs" xmlns:ns2="MyNs2">
    <myns:MoreTags>foo</myns:MoreTags>
    <po:quantity>1200</po:quantity>
</myns:SomeOtherTag>
```

The prefix "po" is undefined in this fragment.

When this fragment's ancestors are considered in step 250, the following list of definitions is created:

xmlns:po2="po2.xsd" xmlns:po="po.xsd"

After splicing in the list of definitions into the fragment at step 280, the resulting fragment is:

```
<myns:SomeOtherTag xmlns:myns="MyNs" xmlns:ns2="MyNs2"
    xmlns:po2="po2.xsd" xmlns:po="po.xsd">
    <myns:MoreTags>foo</myns:MoreTags>
    <po:quantity>1200</po:quantity>
</myns:SomeOtherTag>
```

While the declaration xmlns:ps2="po2.xsd" is not required to make this example fragment a self-contained fragment, its inclusion does not invalidate the fragment or change the fragment's meaning. In an alternative embodiment, the declarations are examined to determine if they are needed for the node being extracted before they are patched into the fragment.

The self-contained fragment created at step 280 that contains all the information needed for proper interpretation is then returned at step 290.

While the techniques described herein have been described in the context of namespace declarations and prefixes, the techniques can be used in other circumstances. For example, the presence of entity or macro references similarly complicates the self-contained nature of fragments. Like namespaces, a fragment identified by a CLOB offset cannot simply be streamed out as any entity references need to be prepended with DTD (Data Type Definition) declarations.

Hardware Overview

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are performed by computer system 100 in response to processor 104 executing one or more sequences of one or more instructions contained in main memory 106. Such instructions may be read into main memory 106 from another machine-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 100, various machine-readable media are involved, for example, in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118.

The received code may be executed by processor 104 as it is received, and/or stored in storage device 110, or other non-volatile storage for later execution. In this manner, computer system 100 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising the computer-implemented steps of:
   storing, in an index, text strings for simple elements and offset information for complex elements, wherein storing comprises:
      storing, in the index, a single text string of each of one or more simple elements contained within an XML document that is managed by a database management system and that is indexed by the index, and
      storing, in the index, offset information of each of one or more complex elements contained within the XML document, wherein the offset information indicates where each of the one or more complex elements is located within the XML document;
   receiving a request for an XML fragment, wherein the request includes an XML path expression;
   in response to receiving the request:
      using the index to identify a node that the XML path expression identifies;
         wherein the node resides in the XML document;
         wherein the XML document is stored within one or more base structures managed by the database management system;
      determining whether the node is for a simple element, wherein a simple element is an element (a) with no attributes or children elements and (b) whose value is a single text string; and
      in response to determining that the node is for a simple element, performing the steps of:
         constructing the XML fragment for the node based on information contained in the index without accessing the one or more base structures,
         wherein constructing the XML fragment includes creating a start tag, creating an end tag, and reading the single text string of the simple element from the index,
         wherein the XML fragment comprises the start tag, the single text string of the simple element, and the end tag; and
         providing the XML fragment in response to the request;
   wherein the steps are performed by one or more computing devices.

2. The method of claim 1, wherein creating at least one of the start tag or the end tag is performed by extracting the last component of the XML path expression.

3. The method of claim 1, wherein creating at least one of the start tag or the end tag is performed by using the index.

4. The method of claim 1, wherein the index includes path, value, and order indexes.

5. The method of claim 1, wherein:
   the index comprises a table that comprises a plurality of rows and a plurality of columns that includes a locator column;
   information about the node is stored in a particular row of the plurality of rows; and
   determining whether the node is for a simple element comprises analyzing the locator column of the particular row to determine whether the node is for a simple element.

6. A non-transitory machine-readable medium storing instructions which, when executed by one or more processors, causes:
   storing, in an index, text strings for simple elements and offset information for complex elements, wherein storing comprises:
      storing, in the index, a single text string of each of one or more simple elements contained within an XML document that is managed by a database management system and that is indexed by the index, and
      storing, in the index, offset information of each of one or more complex elements contained within the XML document, wherein the offset information indicates where each of the one or more complex elements is located within the XML document;
   receiving a request for an XML fragment, wherein the request includes an XML path expression;
   in response to receiving the request:
      using the index to identify a node that the XML path expression identifies;
         wherein the node resides in the XML document;
         wherein the XML document is stored within one or more base structures managed by the database management system;
      determining whether the node is for a simple element, wherein a simple element is an element (a) with no attributes or children elements and (b) whose value is a single text string; and
      in response to determining that the node is for a simple element, performing the steps of:
         constructing the XML fragment for the node based on information contained in the index without accessing the one or more base structures,
         wherein constructing the XML fragment includes creating a start tag, creating an end tag, and reading the single text string of the simple element from the index,
         wherein the XML fragment comprises the start tag, the single text string of the simple element, and the end tag; and
         providing the XML fragment in response to the request.

7. The machine-readable medium of claim 6, wherein creating at least one of the start tag or the end tag is performed by extracting the last component of the XML path expression.

8. The machine-readable medium of claim 6, wherein creating at least one of the start tag or the end tag is performed by using the index.

9. The machine-readable medium of claim 6, wherein the index includes path, value, and order indexes.

10. The machine-readable medium of claim 6, wherein:
    the index comprises a table that comprises a plurality of rows and a plurality of columns that includes a locator column;
    information about the node is stored in a particular row of the plurality of rows; and
    determining whether the node is for a simple element comprises analyzing the locator column of the particular row to determine whether the node is for a simple element.

* * * * *

UNITED STATES PATENT AND TRADEMARK OFFICE
CERTIFICATE OF CORRECTION

PATENT NO.        : 8,001,127 B2  
APPLICATION NO.   : 12/103880  
DATED             : August 16, 2011  
INVENTOR(S)       : Chandrasekar et al.

Page 1 of 1

It is certified that error appears in the above-identified patent and that said Letters Patent is hereby corrected as shown below:

In column 7, line 22, delete "column)" and insert -- column). --, therefor.

In column 10, line 26, delete "cell" and insert -- call --, therefor.

In column 17, line 6, delete "purchaseOrder" and insert -- PurchaseOrder --, therefor.

In column 17, line 21, delete "purchaseOrder" and insert -- PurchaseOrder --, therefor.

In column 18, line 28, delete "purchaseOrder" and insert -- PurchaseOrder --, therefor.

Signed and Sealed this  
Fifteenth Day of November, 2011

David J. Kappos  
*Director of the United States Patent and Trademark Office*